United States Patent
Yoshida (10) Patent No.: US 11,106,316 B2
(45) Date of Patent: Aug. 31, 2021

(54) DISPLAY PANEL HAVING OVERLAPPING POSITION DETECTION LEAD-OUT LINES DISPOSED IN DIFFERENT LAYERS

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/633,095

(22) PCT Filed: Jul. 19, 2018

(86) PCT No.: PCT/JP2018/027046
§ 371 (c)(1),
(2) Date: Jan. 22, 2020

(87) PCT Pub. No.: WO2019/021927
PCT Pub. Date: Jan. 31, 2019

(65) Prior Publication Data
US 2021/0132735 A1    May 6, 2021

(30) Foreign Application Priority Data
Jul. 26, 2017    (JP) .............................. JP2017-144283

(51) Int. Cl.
*G06F 3/041*    (2006.01)
*G06F 3/044*    (2006.01)
*G02F 1/1333*    (2006.01)
*G02F 1/1339*    (2006.01)
*G02F 1/1343*    (2006.01)

(52) U.S. Cl.
CPC ............ *G06F 3/044* (2013.01); *G02F 1/1339* (2013.01); *G02F 1/13338* (2013.01); *G02F 1/134309* (2013.01); *G06F 3/0443* (2019.05)

(58) Field of Classification Search
CPC ................................................ G06F 3/041–048
See application file for complete search history.

(56) References Cited

U.S. PATENT DOCUMENTS

| | | | |
|---|---|---|---|
| 2016/0041665 A1 | 2/2016 | Gwon et al. | |
| 2018/0239476 A1* | 8/2018 | Yoshida | G06F 3/044 |
| 2018/0267657 A1* | 9/2018 | Shao | G06F 3/04164 |

FOREIGN PATENT DOCUMENTS

| | | |
|---|---|---|
| JP | 2016-035596 A | 3/2016 |
| JP | 2016-038594 A | 3/2016 |
| WO | 2017/033759 A1 | 3/2017 |

* cited by examiner

*Primary Examiner* — Roy P Rabindranath
(74) *Attorney, Agent, or Firm* — ScienBiziP, P.C.

(57) ABSTRACT

A display panel includes pixel electrodes disposed in a display region, position detection electrodes constituting a common electrode, a source line, position detection lines disposed in a layer identical to a layer of the source line and each connected to one of the position detection electrodes, a first position detection lead-out line disposed in a layer identical to a layer of the source line in a non-display region and extending from one end of one of the position detection lines, and a second position detection lead-out line disposed in a layer different from a layer of the source line in the non-display region and extending from one end of another of the position detection lines, the second position detection lead-out line extending overlapping the first position detection lead-out line.

6 Claims, 10 Drawing Sheets

DISPLAY PANEL HAVING OVERLAPPING POSITION DETECTION LEAD-OUT LINES DISPOSED IN DIFFERENT LAYERS

TECHNICAL FIELD

The disclosure relates to a display panel.

BACKGROUND ART

In the related art, a display panel described in PTL 1 below has been known as an example of a display panel incorporating an in-cell touch panel function. The display panel described in PTL 1 includes a plurality of touch electrodes (constituting a common electrode), a plurality of pixel electrodes (pixel electrodes), and a source drive touch sensing IC, which are formed on a substrate. In general, the touch electrode and the pixel electrode are electrically connected to the source drive touch sensing IC (driver) with the respective lead-out lines formed in a non-display region (frame portion) of the display panel interposed therebetween.

CITATION LIST

Patent Literature

PTL 1: JP 2016-38594 A

Technical Problem

In recent years, both high definition (high resolution) and frame narrowing have been required in a display panel. To achieve this, an area covered by the lead-out lines on the substrate needs to be further reduced. To further reduce the area covered by the lead-out lines, it is conceivable that two lead-out lines are formed in different layers and overlapped with each other. However, with such a configuration, a signal supplied to one lead-out line causes a change in electrical potential of the other lead-out line, which may degrade display quality.

SUMMARY

The disclosure has been completed on the basis of the circumstances described above, and an object of the disclosure is to further reduce an area covered by lead-out lines and suppress a situation in which display quality degrades.

Solution to Problem

To solve the above problem, a display panel according to an aspect of the disclosure includes a substrate divided into a display region configured to allow an image to be displayed and a non-display region surrounding the display region, a plurality of pixel electrodes disposed in the display region, a plurality of position detection electrodes disposed in the display region and configured to detect an input position by a position input body, the plurality of position detection electrodes constituting a common electrode disposed overlapping the plurality of pixel electrodes, a pixel line disposed in the display region and connected to pixel electrodes of the plurality of pixel electrodes, a plurality of position detection lines disposed in a layer identical to a layer of the pixel line in the display region and each connected to a position detection electrode of the plurality of position detection electrodes, a pixel lead-out line disposed in the non-display region and extending from one end of the pixel line, a first position detection lead-out line disposed in a layer identical to a layer of the pixel line in the non-display region and extending from one end of a position detection line of the plurality of position detection lines, and a second position detection lead-out line disposed in a layer different from a layer of the pixel line in the non-display region and extending from one end of a position detection line of the plurality of position detection lines different from the position detection line from which the first position detection lead-out line extends, the second position detection lead-out line extending overlapping the first position detection lead-out line.

In the configuration described above, since two position detection lead-out lines (the first position detection lead-out line and the second position detection lead-out line) are overlapped with each other, an area covered by the position detection lead-out lines on the substrate can be further reduced. In a case that the position detection lead-out line and the pixel lead-out line are overlapped with each other, a signal supplied to the pixel electrode via the pixel lead-out line may cause a change in electrical potential of the position detection lead-out line. In a case that the electrical potential of the position detection lead-out line changes, the electrical potential of the position detection electrode (furthermore, the common electrode) changes, and as a result, display quality may degrade. In the configuration described above, since the two position detection lead-out lines are overlapped with each other, a situation in which the display quality degrades can be suppressed.

Advantageous Effects of Disclosure

According to the disclosure, an area covered by lead-out lines can be further reduced, and a situation in which display quality degrades can be suppressed.

DESCRIPTION OF EMBODIMENTS

First Embodiment

Figure 1:
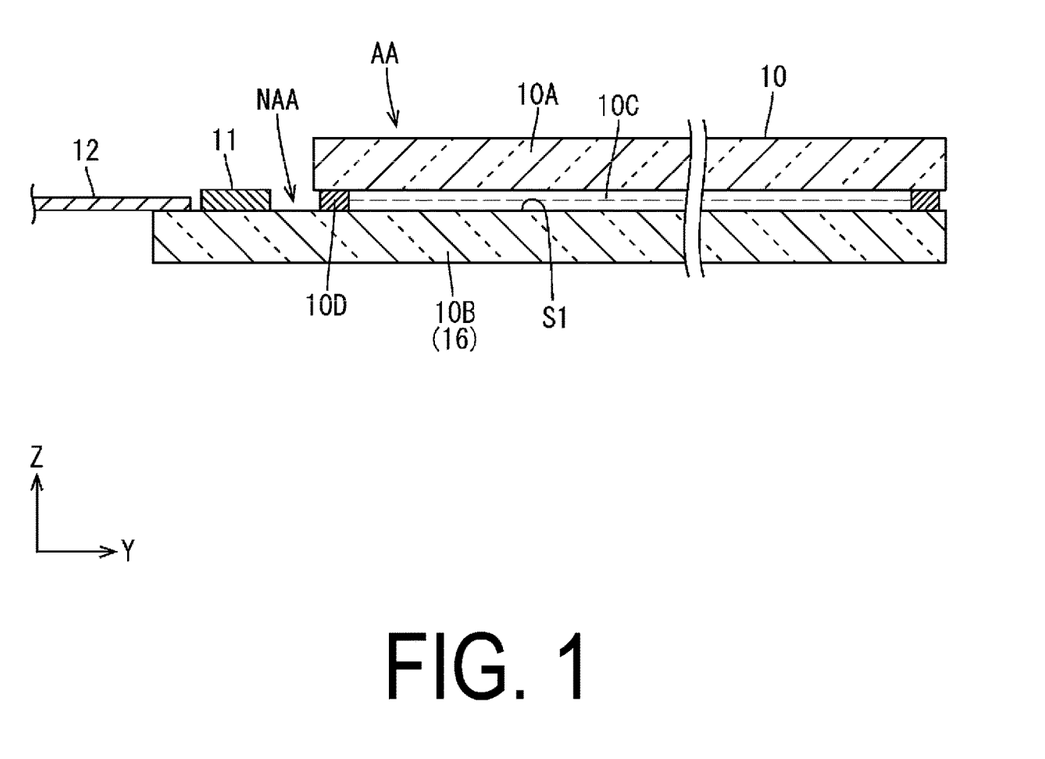
FIG. 1 is a cross-sectional view schematically illustrating a liquid crystal panel according to a first embodiment of the disclosure.

The first embodiment of the disclosure will be described with reference to FIGS. 1 to 6. In the present embodiment, a liquid crystal panel 10 (display panel) having a touch panel function (position input function) in addition to a display function is exemplified. Note that the X axis, the Y axis, and the Z axis are illustrated in a part of each drawing, and each axial direction is illustrated to be the direction illustrated in each drawing. Furthermore, a vertical direction is based on the vertical direction of FIG. 1, an upper side of the same drawing is referred to as a front side, and a lower side of the same drawing is referred to as a back side. The liquid crystal panel 10 is configured to display an image using illumination light emitted from a backlight device (illumination device) (not illustrated). As illustrated in FIG. 1, the liquid crystal panel 10 includes at least a pair of glass substrates 10A and 10B, a liquid crystal layer 10C, and a sealing member 10D. The glass substrates are almost transparent and have excellent light-transmitting properties. The liquid crystal layer 10C is disposed in an internal space S1 between plate surfaces of both the substrates 10A and 10B facing to each other and includes liquid crystal molecules, optical characteristics of which change depending on an applied electrical field. The front side (front surface side) substrate of the pair of substrates 10A and 10B constituting the liquid crystal panel 10 is a CF substrate 10A (counter substrate), and a back side (back surface side) substrate thereof is an array substrate 10B (wiring substrate, active matrix substrate). The CF substrate 10A and the array substrate 10B are each formed by layering various films on the inner surface of the glass substrate.

Figure 2:
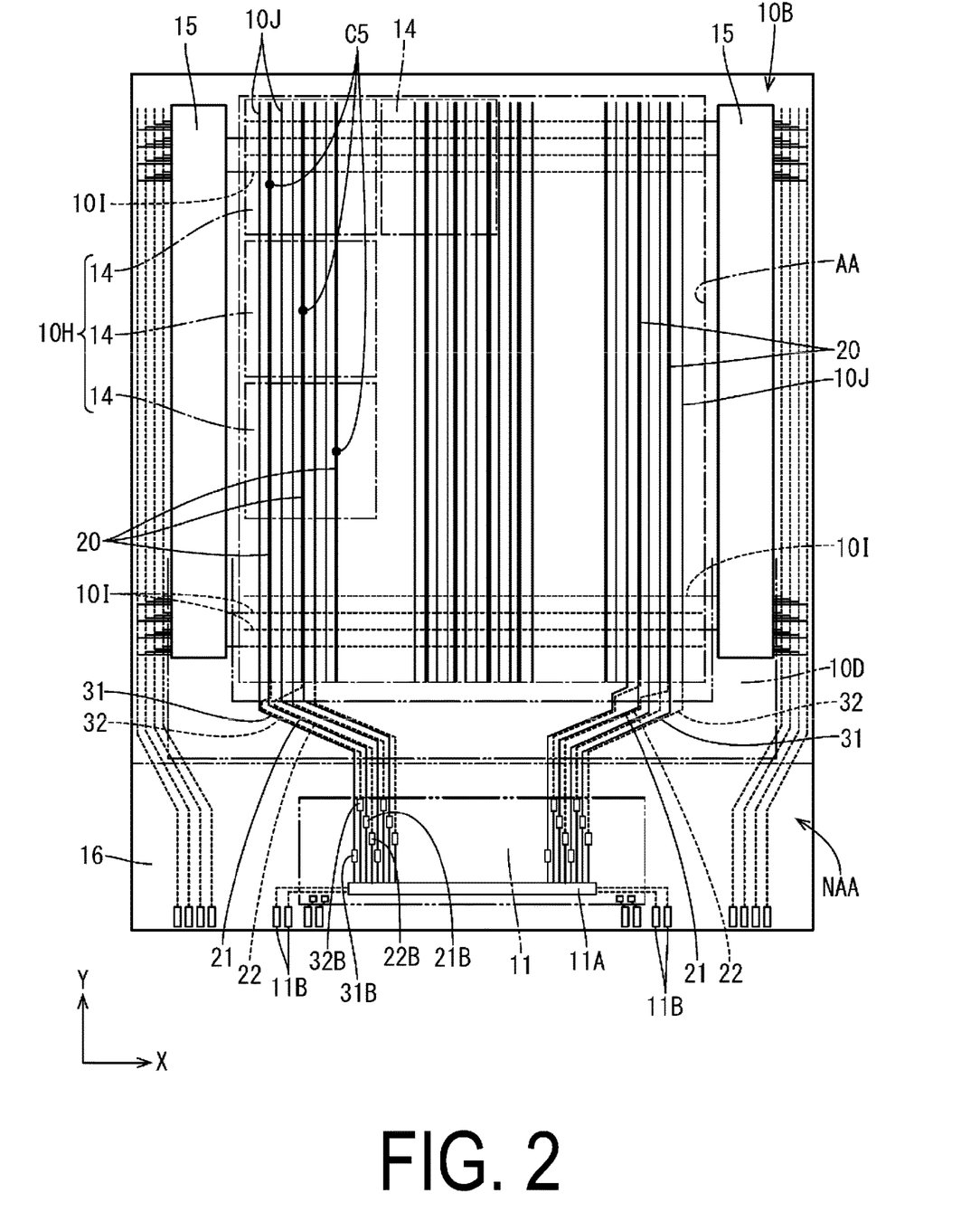
FIG. 2 is a plan view schematically illustrating a line configuration of an array substrate constituting a liquid crystal panel.

The CF substrate 10A is spaced from and faces the array substrate 10B. The sealing member 10D is formed from a photocurable resin material such as an ultraviolet-curing resin material, for example. The sealing member 10D has a rectangular frame shape, is disposed surrounding the internal space S1 between the array substrate 10B and the CF substrate 10A, and seals the liquid crystal layer 10C. Note that polarizing plates (not illustrated) are attached to the outer surfaces of both the substrates 10A and 10B, respectively. In FIG. 2, a portion of the sealing member 10D is illustrated with a two-dot chain line.

The liquid crystal panel 10 (furthermore, the array substrate 10B) is divided into a display region AA where an image can be displayed and a non-display region NAA where an image is not displayed. As illustrated in FIG. 2 with a dashed line, the display region AA has a rectangular shape and is disposed in the center portion of the liquid crystal panel 10. The non-display region NAA is a frame-shaped outer peripheral portion surrounding the display region AA. As illustrated in FIG. 1, a portion of the array substrate 10B protrudes laterally with respect to the CF substrate 10A, and a driver 11 and a flexible substrate 12 are mounted on the protruding portion (non-display region NAA) as components configured to supply various signals related to the display function and the touch panel function. One end portion of the flexible substrate 12 is connected to the array substrate 10B, and the other end portion thereof is connected to a control substrate (not illustrated). Various signals supplied from the control substrate are transmitted to the liquid crystal panel 10 via the flexible substrate 12 and outputted to the display region AA after processed by the driver 11 in the non-display region NAA.

Figure 3:
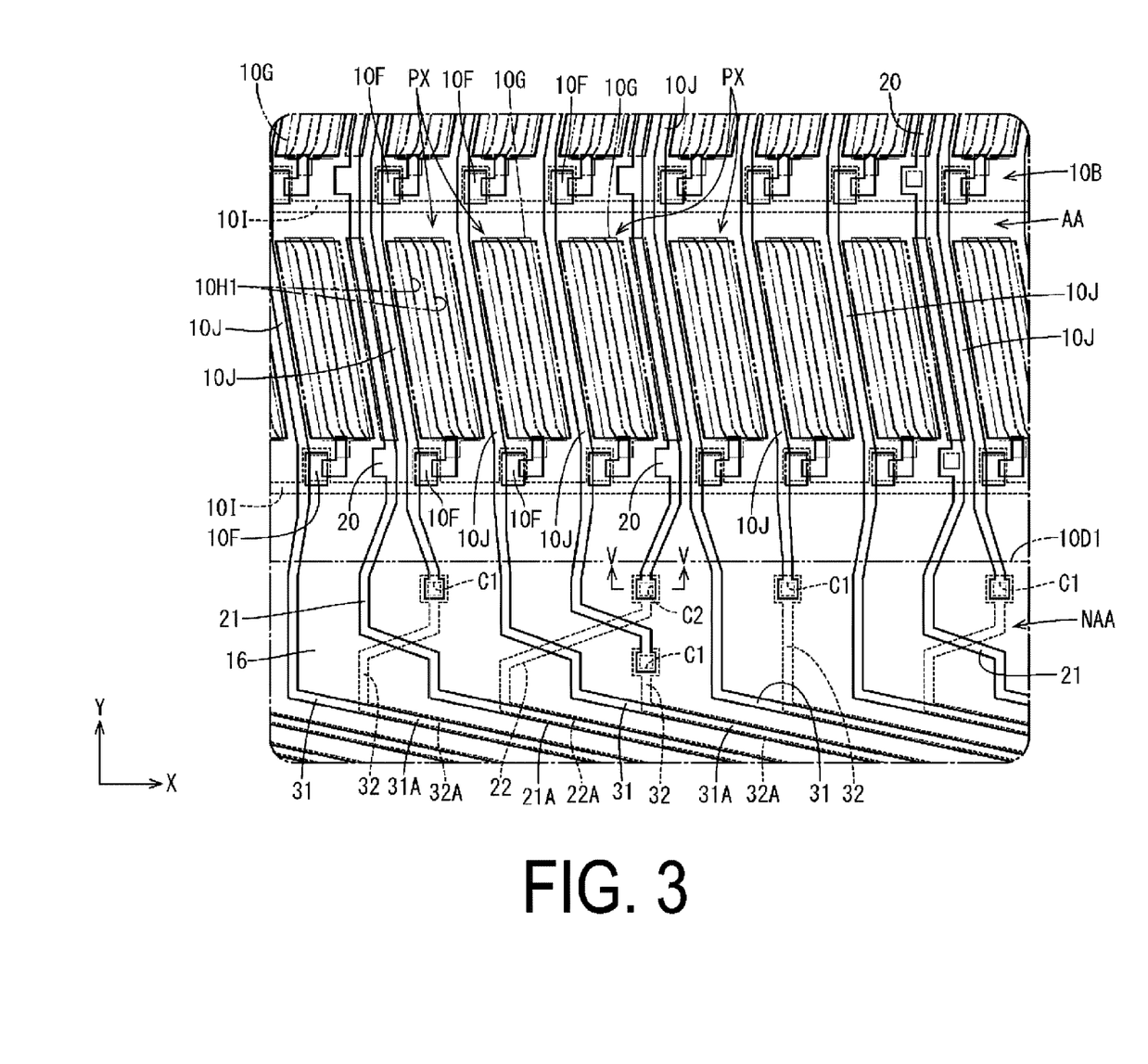
FIG. 3 is an enlarged view illustrating an enlarged boundary portion between a display region and a non-display region in FIG. 2.
Figure 4:
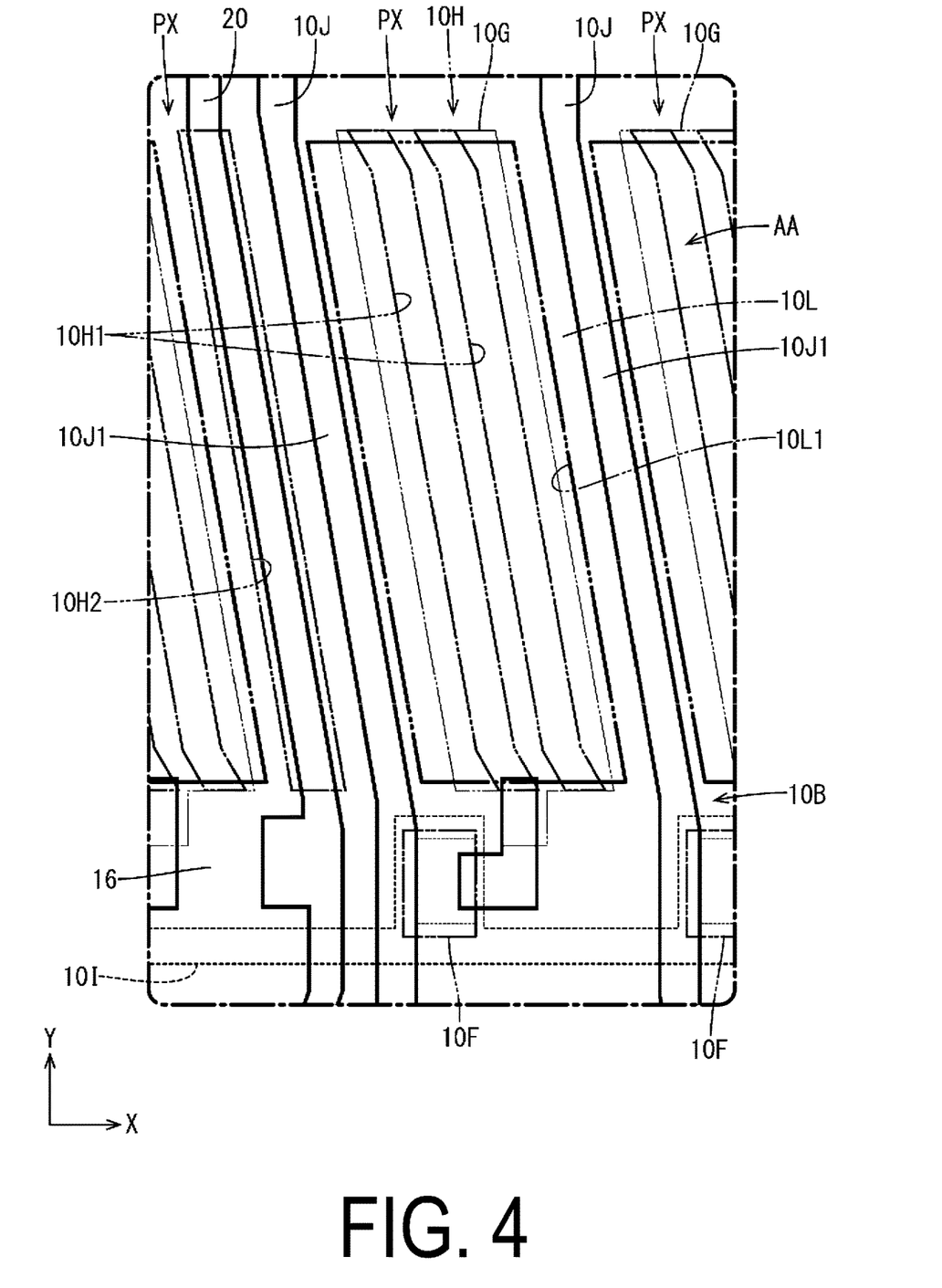
FIG. 4 is a plan view illustrating a pixel arrangement of an array substrate.

As illustrated in FIGS. 3 and 4, a plurality of sets of TFT 10F and pixel electrode 10G are disposed side-by-side along the X-axis direction and the Y-axis direction in a matrix-shaped manner in the display region AA on the inner surface of the glass substrate 16 constituting the array substrate 10B. A gate line 10I and a source line 10J, which are formed in a substantially lattice-shaped manner, are disposed around and surround the TFT 10F and the pixel electrode 10G. While the gate line 10I extends almost straight along the X-axis direction, the source line 10J extends mostly along the Y-axis direction, and a portion thereof extends along an inclined direction with respect to the Y-axis direction. The gate line 10I is connected to a gate electrode of the TFT 10F, and the source line 10J is connected to a source electrode of the TFT 10F. The pixel electrode JOG is connected to a drain electrode of the TFT 10F. In other words, the source line 10J (pixel line) is connected to the pixel electrode 10G with the TFT OF interposed therebetween. Note that examples of the material of a semiconductor film constituting the TFT 10F include amorphous silicon and In—Ga—Zn—O based semiconductor (indium gallium zinc oxide); however, no such limitation is intended. Note that "the pixel line connected to the pixel electrode 10G" means that the pixel line includes a pixel line connected to the pixel electrode 10G with the TFT 10F interposed therebetween.

The TFT 10F is driven on the basis of various signals respectively supplied to the gate line 10I and the source line 10J, and as with the driving of the TFT 10F, the supply of electrical potential to the pixel electrode 10G is controlled. The planar shape of the pixel electrode 10G is a substantially vertically long parallelogram. The source line 10J is interposed between the pixel electrodes 10G adjacent to each other in the X-axis direction, and the gate line 10I is interposed between the pixel electrodes 10G adjacent to each other in the Y-axis direction. Additionally, color filters of three colors (not illustrated) that exhibit red (R), green (g), and blue (b) are provided on the CF substrate 10A. In the liquid crystal panel 10, a pixel portion PX is configured by one pixel electrode 10G and a color filter of one color facing to each other. In other words, the liquid crystal panel 10 includes pixel portions PX of three colors corresponding to the color filters of three colors.

A common electrode 10H is formed overlapping all of the pixel electrodes 10G at the glass substrate 16. The common electrode 10H is disposed in an upper layer (the front side in FIG. 4) than the pixel electrode 10G. Note that, in FIGS. 3 and 4, basically, components formed in a front side layer of a layer in which the source line 10J is formed are indicated by a two-dot chain line, and components formed in a back side layer of the layer in which the source line 10J is formed are indicated by a dashed line. The common electrode 10H is configured to be supplied with a constant reference potential and extends across almost the entire display region AA. The common electrode 10H includes a plurality of pixel overlapping openings 10H1 formed for each portion overlapping the pixel electrode 10G. The pixel overlapping opening 10H1 extends along an inclined extending portion 10J1 of the source line 10J. In a case that the pixel electrode 10G is charged, and thus, a potential difference is generated between the pixel electrode 10G and the common electrode 10H overlapping with each other, a fringe electrical field (oblique electrical field) including a component in the normal direction to the plate surface of the array substrate 10B, in addition to a component along the plate surface of the array substrate 10B, is generated between an opening edge of the pixel overlapping opening 10H1 and the pixel electrode 10G. The alignment state of the liquid crystal molecules included in the liquid crystal layer 10C can be controlled using the fringe electrical field. In other words, the liquid crystal panel 10 according to the present embodiment has an operation mode of a Fringe Field Switching (FFS) mode. In FIG. 4, a light blocking portion 10L formed in the display region AA on the inner surface of the CF substrate 10A is indicated by a two-dot chain line. The light blocking portion 10L has a substantially lattice shape and includes a pixel opening 10L1 configured to allow light to pass therethough at a position overlapping a large portion of the pixel electrode 10G. The light blocking portion 10L has a function to prevent color mixing generated between the pixel portions PX that exhibit different colors. The pixel electrode 10G and the common electrode 10H are formed from a transparent electrode material (e.g., Indium Tin Oxide (ITO), Indium Zinc Oxide (IZO), and the like).

The liquid crystal panel 10 according to the present embodiment has a display function for displaying an image and a touch panel function (position input function) for detecting a position (input position) input by a user on the basis of the displayed image. For the touch panel function, a touch panel pattern configured to exhibit the touch panel function is integrated into the liquid crystal panel 10 (forming an in-cell touch panel). The touch panel pattern is used to form a so-called projected capacitive type touch panel, and the detection type thereof is a self-capacitance type. As illustrated in FIG. 2, the touch panel pattern is configured by a plurality of position detection electrodes 14 disposed side-by-side in a matrix-shaped manner in the plate surface of the glass substrate 16. The position detection electrodes 14 are disposed in the display region AA. In a case that a user of the liquid crystal panel 10 brings a finger (position input body) (not illustrated) that is an electrical conductor close to the surface (display surface) of the liquid crystal panel 10, electrostatic capacitance is formed between the finger and the position detection electrode 14. Accordingly, electrostatic capacitance detected by the position detection electrode 14 near the finger changes as the finger is brought close to the surface, and the electrostatic capacitance is different from that of the position detection electrode 14 away from the finger, and this difference makes it possible to detect an input position by the finger. The common electrode 10H described above is configured by a plurality of position detection electrodes 14.

The gate drivers 15 connected to the respective gate lines 10I are provided on the both end portions in the X-axis direction of the glass substrate 16 constituting the array substrate 10B, respectively. The gate driver 15 has a shape long in the Y-axis direction and is formed in a monolithic manner on the glass substrate 16, for example. Note that, in the present embodiment, one gate line 10I is connected to any one of the pair of gate drivers 15 and 15, and the gate lines 10I are configured such that a gate line 10I connected to a left gate driver 15 in FIG. 2 and a gate line 10I connected to a right gate driver 15 in FIG. 2 are arranged in an alternative manner in the Y-axis direction.

As illustrated in FIGS. 2 and 3, a position detection line 20 extending in the Y-axis direction is connected to the position detection electrode 14 with a contact hole C5 interposed therebetween (see FIG. 2). Note that the contact hole C5 is formed in an interlayer insulating film 24 illustrated in FIG. 5, for example. As illustrated in FIG. 4, the position detection line 20 is disposed in the same layer as that of the source line 10J in the display region AA. Therefore, the position detection line 20 and the source line 10J can be formed in the same step. As illustrated in FIGS. 3 and 4, in the present embodiment, the position detection line 20 extends adjacent to the source line 10J. Additionally, the total number of position detection electrodes 14 is less than the total number of pixel electrodes 10G. Specifically, in both the X-axis direction and the Y-axis direction, the arrangement number of position detection electrodes 14 is less than the arrangement number of pixel electrodes 10G (pixel portions PX). As a result, the number of position detection lines 20 is less than the number of source lines 10J. Thus, as illustrated in FIG. 3, in the present embodiment, one position detection line 20 is disposed for every three pixel portions PX arranged in the X-axis direction. Note that, as described above, since the arrangement number of position detection electrodes 14 is less than the arrangement number of pixel electrodes 10G (a pixel portion PX), the size of the position detection electrode 14 is larger than the size of the pixel portion PX. For example, while each of the width in the X-axis direction and the width in the Y-axis direction of the pixel portion PX is from several ten μm to a hundred and several tens μm, the position detection electrode 14 has a substantially rectangular shape with one side the size of several mm (for example, approximately from 2 mm to 5 mm). Also, as illustrated in FIG. 4, the position detection electrode 14 includes an opening 10H2 overlapping at least a portion of the position detection line 20, and the opening 10H2 reduces the parasitic capacitance that may be generated between a position detection line 20 and a position detection electrode 14 not connected to the position detection line 20. Accordingly, excellent detection sensitivity when detecting the input position is provided.

As illustrated in FIG. 3, in the non-display region NAA, source lead-out lines 31 and 32 (pixel lead-out lines) extending from one ends of the source lines 10J are formed. In the non-display region NAA, position detection lead-out lines 21 and 22 extending from one ends of the position detection lines 20 are also formed. As illustrated in FIG. 2, the source lead-out lines 31 and 32 and the position detection lead-out lines 21 and 22 each extend toward the driver 11 and are connected to the driver 11 at the respective terminals 31B, 32B, 21B and 22B. In other words, the plurality of source lead-out lines 31 and 32 and the plurality of position detection lead-out lines 21 and 22 each converge as closer to the driver 11 such that they are formed in a substantially fan-shaped manner. A test circuit portion 11A configured to allow the position detection line 20 and the source line 10J to be tested is formed in a mounting region of the driver 11 on the glass substrate 16. The test circuit portion 11A is electrically connected to the terminal portion 11B configured to allow a test signal to be input.

As illustrated in FIG. 3, the source lead-out line 31 (first pixel lead-out line) is formed in the same layer as that of the source line 10J. In contrast, the source lead-out line 32 (a second pixel lead-out line) is formed in the same layer as that of the gate line 10I and is connected to the source line 10J with the contact hole C1 therebetween. The source lead-out line 31 and the source lead-out line 32 are disposed adjacent to each other in the X-axis direction. The source lead-out line 31 includes an inclined extending portion 31A extending in an inclined direction with respect to the Y-axis direction. The source lead-out line 32 includes an inclined extending portion 32A extending in an inclined direction with respect to the Y-axis direction. The inclined extending portions 31A and 32A extend overlapping with each other.

As illustrated in FIG. 3, the position detection lead-out line 21 (a first position detection lead-out line) is formed in the same layer as that of the source line 10J. The position detection lead-out line 22 (a second position detection lead-out line) extends from one end of the position detection line 20 connected to the position detection electrode 14 different from the position detection electrode 14 connected to the position detection line 20 from which the position detection line 21 extends. The position detection lead-out lines 21 and 22 are connected to two adjacent position detection lines 20 and 20, respectively. The position detection lead-out line 22 is disposed in the same layer as that of the gate line 10I (a layer different from that of the source line 10J) and is connected to the position detection line 20 with a contact hole C2 interposed therebetween. In other words, the position detection lead-out line 22 and the source lead-out line 32 are disposed in the same layer. Note that the contact holes C1 and C2 are formed in a region where the position detection electrode 14 (the common electrode 10H) is not disposed.

The position detection lead-out line 21 and the position detection lead-out line 22 include inclined extending portions 21A and 22A extending in an inclined direction with respect to the Y-axis direction, respectively. The inclined extending portions 21A and 22A extend overlapping with each other. Furthermore, a portion of the scaling member 10D is disposed overlapping the plurality of source lead-out lines 31 and 32 and the plurality of position detection lead-out lines 21 and 22. Note that, in FIG. 3, the upper side of the two-dot chain line denoted by a reference sign 10D1 is a region where the position detection electrode 14 (the common electrode 10H) is disposed, and the seal member 10D is formed in the lower region of the two-dot chain line denoted by the reference sign 10D1. Note that a metal material such as Al, Mo, Ti, W, or Cu can be used as a material of the source line 10J, the source lead-out lines 31 and 32, the position detection line 20, and the position detection lead-out lines 21 and 22; however, no such limitation is intended.

Figure 5:
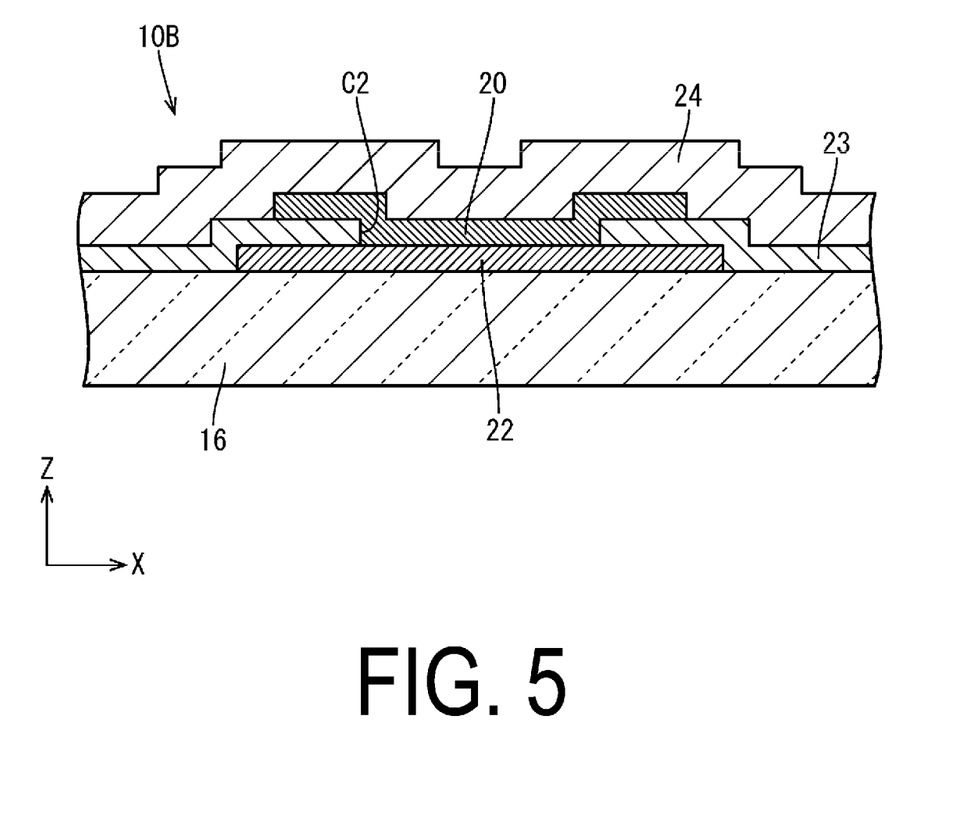
FIG. 5 is a cross-sectional view illustrating a contact hole C2 (corresponding to a view taken along a line V-V in FIG. 3).
Figure 6:
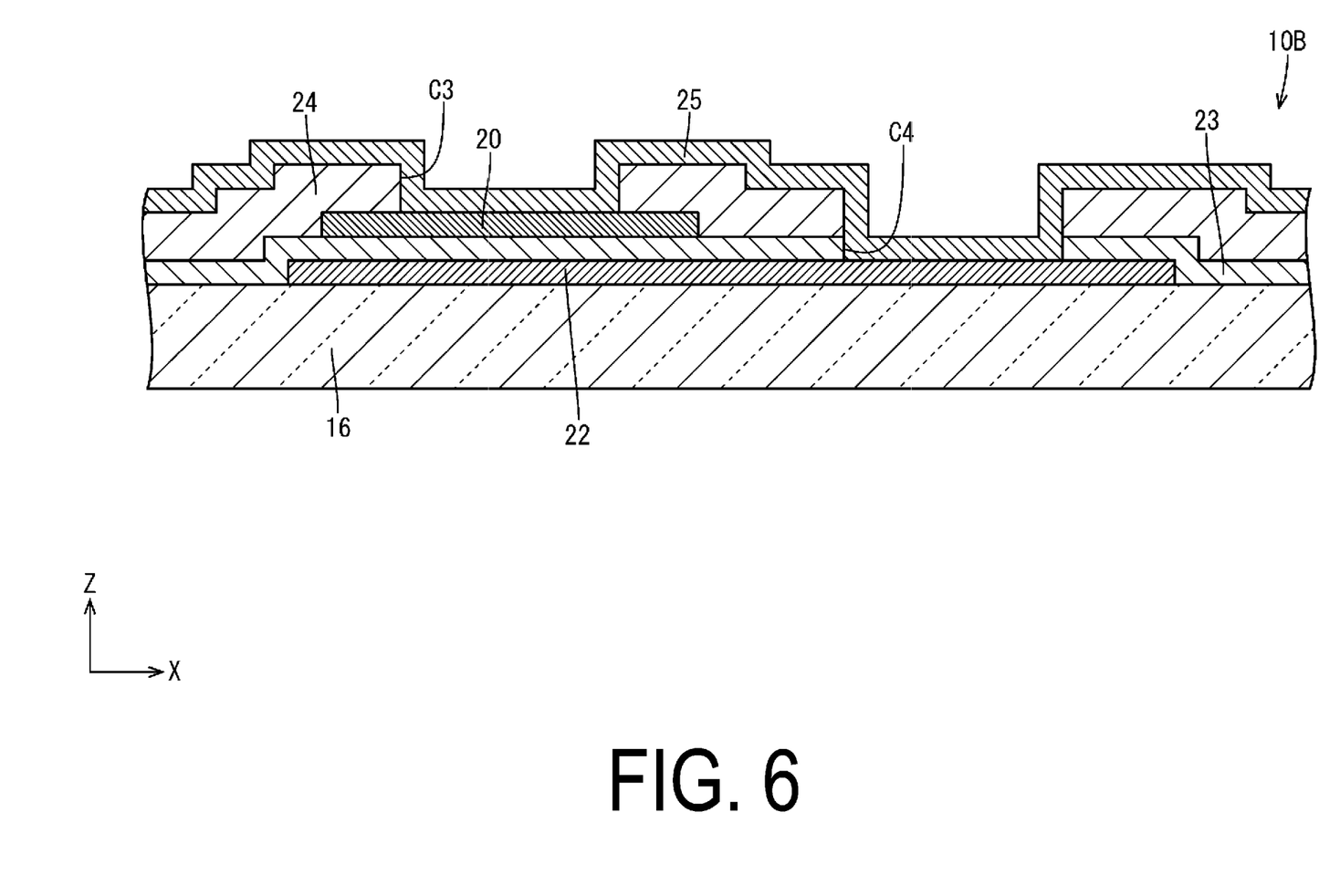
FIG. 6 is a cross-sectional view illustrating a modified example of a contact hole connecting a position detection line and a position detection lead-out line.

As illustrated in FIG. 5, the position detection lead-out line 22 is formed on the glass substrate 16 constituting the array substrate 10B. A gate insulating film 23 is interposed between an end portion of the position detection line 20 and an end portion of the position detection lead-out line 22, and the contact hole C2 is formed in the gate insulating film 23. Note that, although not illustrated, similar to a case of the contact hole C2, the contact hole C1 is formed in the gate insulating film 23. Additionally, as illustrated in a modified example of FIG. 6, a configuration is possible in which contact holes C3 and C4 are formed in the interlayer insulating film 24 and the gate insulating film 23, respectively, and the position detection line 20 and the position detection lead-out line 22 are electrically connected to each other with a portion of a conductive film (a conductive film 25) interposed therebetween, the conductive film being used to form the common electrode 10H (the position detection electrode 14). In other words, the conductive film 25 is formed from the same material as that of the common electrode 10H and can be formed simultaneously therewith in a step of forming the common electrode 10H. Accordingly, the number of manufacturing steps does not increase.

The following will describe effects of the present embodiment. In the present embodiment, since the two adjacent position detection lead-out lines 21 and 22 are overlapped with each other, the area covered by the position detection lead-out lines 21 and 22 on the glass substrate 16 can be further reduced. In a case that the position detection lead-out line and the source lead-out line are overlapped with each other, a signal supplied to the pixel electrode 10G via the source lead-out line may cause a change in electrical potential of the position detection lead-out line. A writing period during which a display signal is written to each pixel portion PX and a detection period during which an input position is detected are set separately, and, preferably, the position detection electrode 14 (the common electrode 10H) is supplied with a constant electrical potential during a period other than the detection period (during the writing period). However, in a case that electrical potential of the position detection lead-out line changes, electrical potential of the position detection electrode 14 (furthermore, the common electrode 10H) changes, and as a result, display quality may degrade. For example, in a case that a black and white checker block pattern is displayed with a gray level display as a background, shadowing may be generated for each position detection electrode 14, or block-like unevenness with different luminance may be generated for each position detection electrode 14. In the above-described configuration, since the two position detection lead-out lines 21 and 22 are overlapped with each other, a situation in which display quality degrades can be suppressed.

Furthermore, the sealing member 10D is disposed overlapping the position detection lead-out lines 21 and 22 and is formed from a photo-curable resin material. In a case that the sealing member 10D is formed from a photo-curable resin, light may be emitted from the direction in which the glass substrate 16 is located in order to cure the sealing member 10D. In the configuration described above, since the area covered by the position detection lead-out lines 21 and 22 can be further reduced, a situation in which light for curing the seal member 10D is blocked by the position detection lead-out lines 21 and 22 can be suppressed.

In addition, of the two adjacent source lead-out lines 31 and 32, the source lead-out line 31 is disposed in the same layer as that of the source line 10J, and the source lead-out line 32 is disposed in the same layer as that of the position detection lead-out line 22 and extends overlapping the source lead-out line 31. Since the two source lead-out lines 31 and 32 are overlapped with each other, the area covered by the source lead-out lines 31 and 32 on the glass substrate 16 can be further reduced.

Second Embodiment

Figure 7:
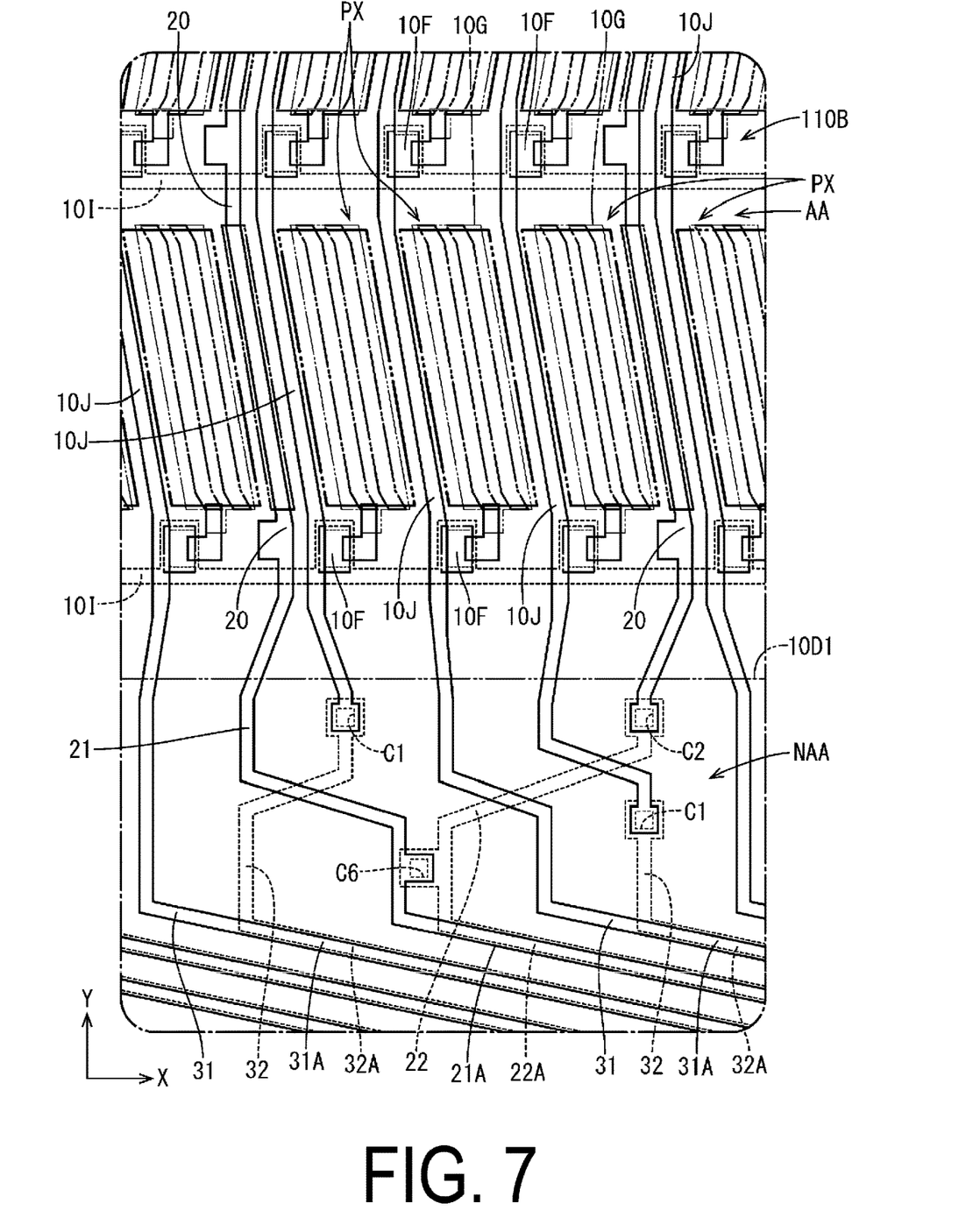
FIG. 7 is a plan view illustrating a boundary portion between a display region and a non-display region of an array substrate according to a second embodiment.
Figure 8:
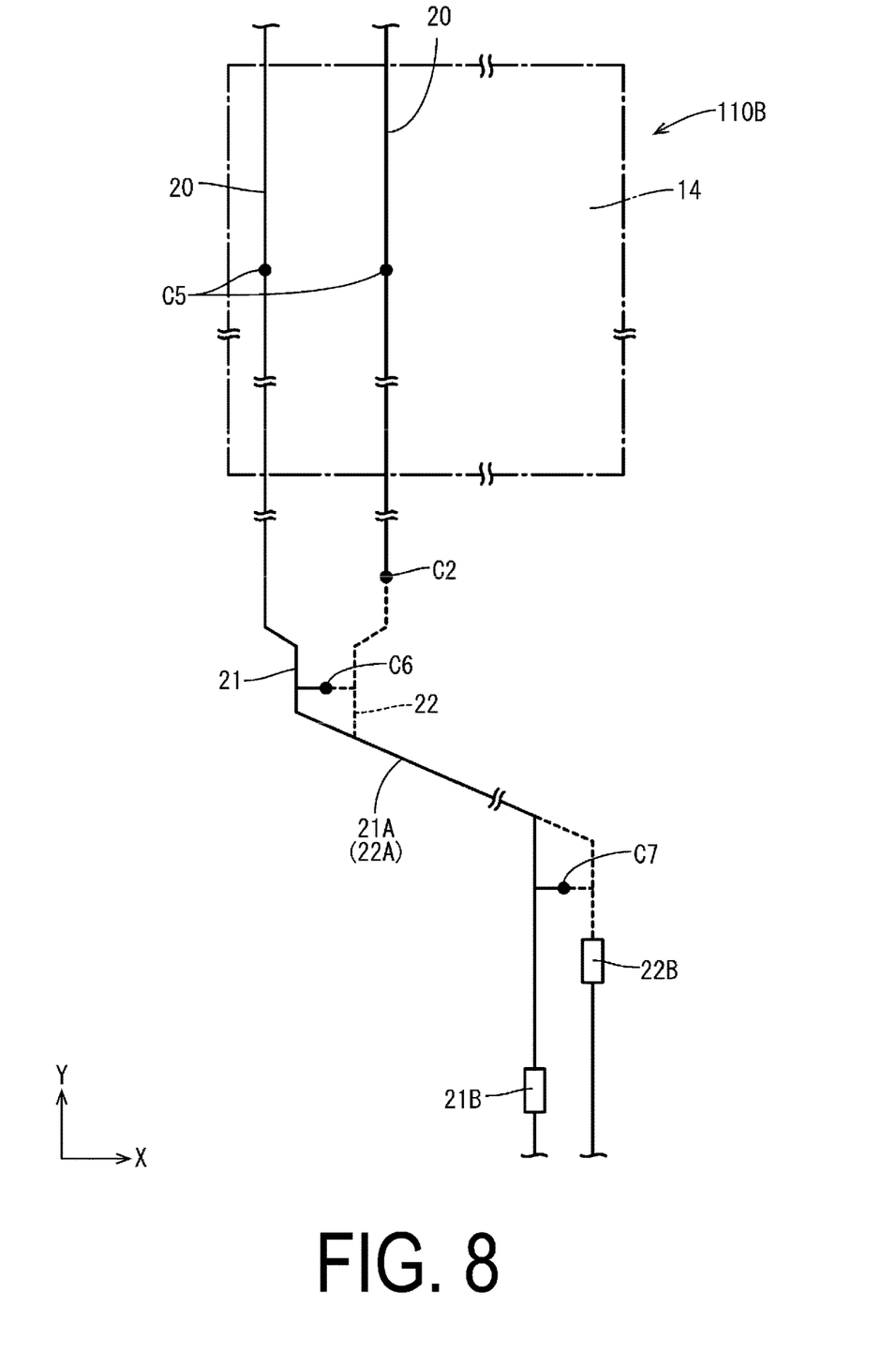
FIG. 8 is a diagram schematically illustrating an electrical configuration of two position detection lead-out lines.

Next, the second embodiment of the disclosure will be described with reference to FIGS. 7 and 8. Portions that are the same as those in the above-described embodiment are given the same reference signs, and redundant descriptions thereof will be omitted. As illustrated in FIG. 8, in an array substrate 10B of the present embodiment, two adjacent position detection lines 20 (furthermore, the position detection lead-out lines 21 and 22) are electrically connected to one position detection electrode 14. As illustrated in FIGS. 7 and 8, the position detection lead-out lines 21 and 22 are electrically connected to each other at two locations (contact holes C3 and C4). The contact hole C6 is disposed closer to the position detection line 20 with respect to the inclined extending portions 21A and 22A, and the contact hole C7 is disposed closer to the terminal portions 21B and 22B with respect to the inclined extending portions 21A and 22A, for example. Note that the contact holes C6 and C7 are formed in the gate insulating film 23 (see FIG. 5). Since the two position detection lead-out lines (the position detection lead-out line 21 and the position detection lead-out line 22) electrically connected to one position detection electrode 14 are electrically connected to each other at two locations, the position detection lead-out line can have lower electrical resistance, and the position detection accuracy can be further enhanced. Furthermore, the position detection lead-out lines 21 and 22 are connected to each other, which can provide redundancy for disconnection. Note that the configuration in which the position detection lead-out lines 21 and 22 are connected to each other is more effective as the total length of the position detection lead-out lines 21 and 22 is greater.

Third Embodiment

Figure 9:
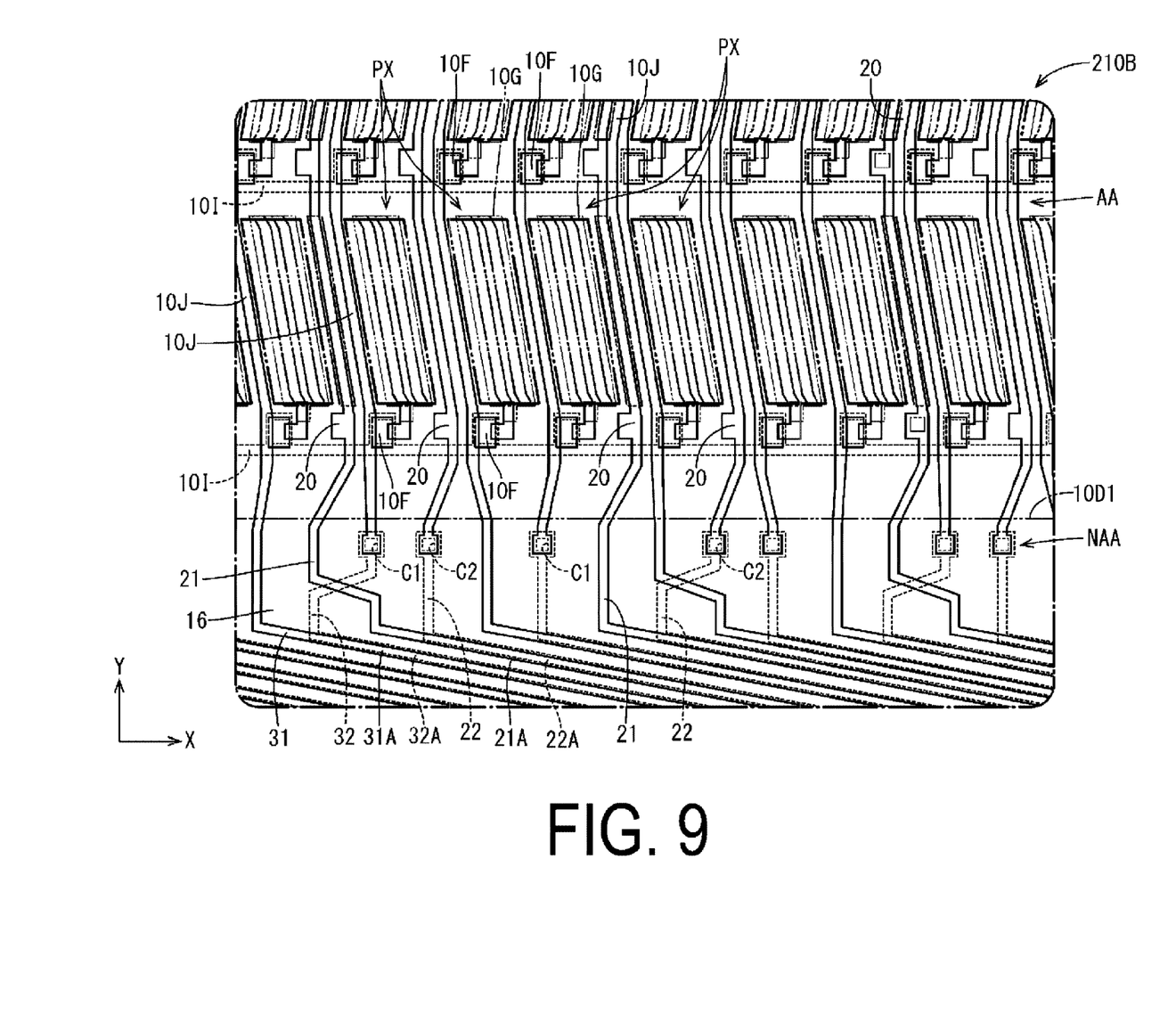
FIG. 9 is a plan view illustrating a boundary portion between a display region and a non-display region of an array substrate according to a third embodiment.

Next, the third embodiment of the disclosure will be described with reference to FIG. 9. Portions that are the same as those in the above-described embodiment are given the same reference signs, and redundant descriptions thereof will be omitted. In each embodiment described above, the configuration is exemplified in which one position detection line 20 is disposed for every three pixel portions PX arranged in the X-axis direction. In contrast, as illustrated in FIG. 9, in an array substrate 210B of the present embodiment, two position detection lines 20 are disposed for every three pixel portions PX arranged in the X-axis direction. The configuration of the second embodiment in which the position detection lead-out lines 21 and 22 are connected to each other can also be applied to the present embodiment.

Fourth Embodiment

Figure 10:
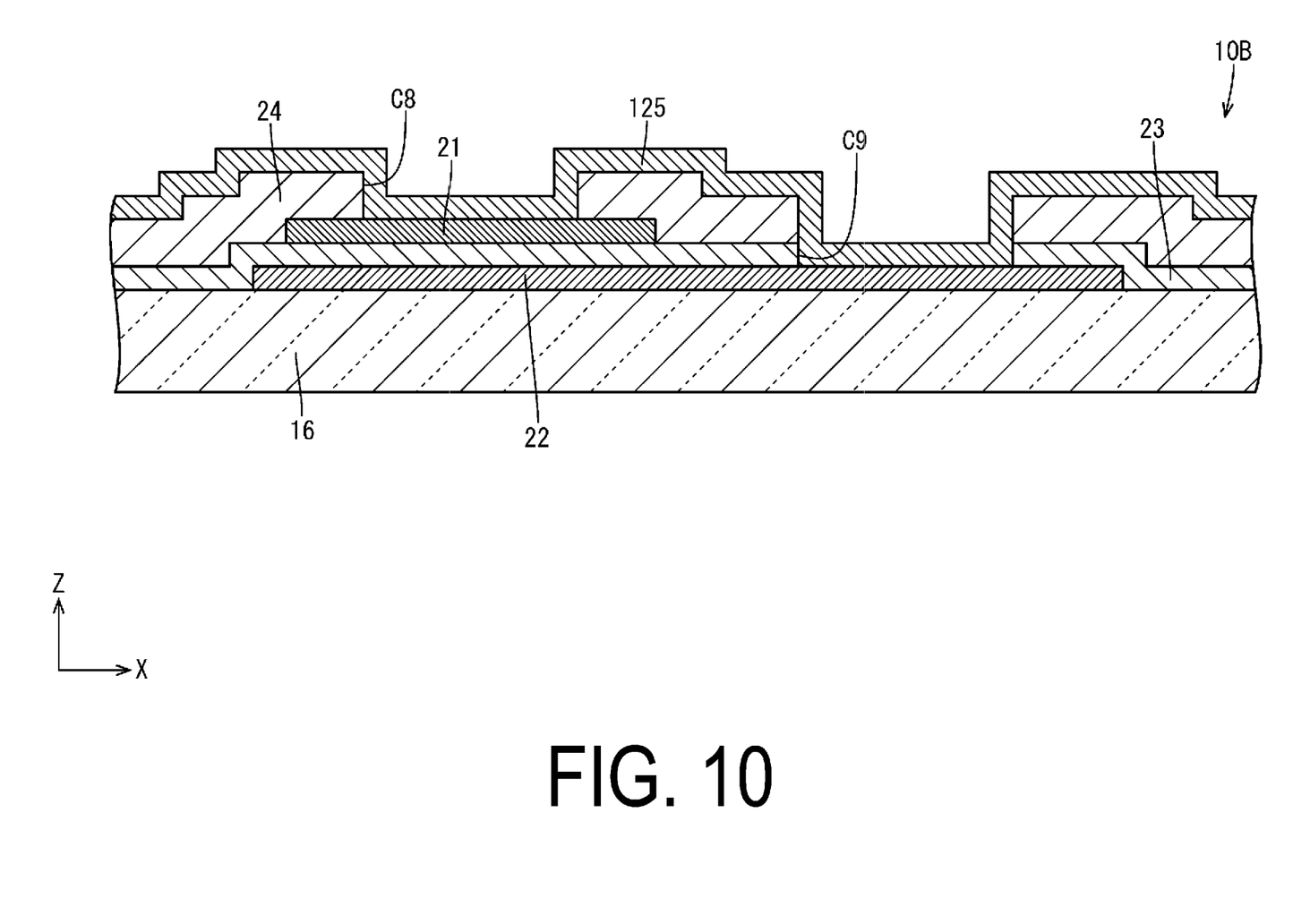
FIG. 10 is a cross-sectional view illustrating a connection structure between a position detection lead-out line 21 and a position detection lead-out line 22 according to a fourth embodiment.

Next, the fourth embodiment of the disclosure will be described with reference to FIG. 10. Portions that are the same as those in the above-described embodiment are given the same reference signs, and redundant descriptions thereof will be omitted. The present embodiment is a modified example of the second embodiment. As illustrated in FIG. 10, in the present embodiment, a contact hole C8 is formed in the interlayer insulating film 24, a contact hole C9 is formed in the gate insulating film 23, and the position detection lead-out line 21 and the position detection lead-out line 22 are electrically connected to each other with a conductive film 125 interposed therebetween. The conductive film 125 is a portion of a conductive film used to form the common electrode 10H (the position detection electrode 14, see FIG. 2). In other words, since the conductive film 125 is formed from the same material as that of the common electrode 10H and can be formed simultaneously therewith in a step of forming the common electrode 10H, the number of the manufacturing steps does not increase.

Other Embodiments

The disclosure is not limited to the embodiments described above and illustrated by the drawings, and embodiments such as those described below are also included within the technical scope of the disclosure.

(1) In each of the embodiments described above, a liquid crystal panel is exemplified as a display panel, but the present technology can be applied to other types of display panels.

(2) In the embodiments described above, a case in which the detection type of the touch panel pattern is a self-capacitance type is illustrated; however, the detection type thereof may be a mutual-capacitance type.

(3) The specific planar shape of the pixel electrode, the gate line, the source line, and the TFT is not limited to that illustrated in the above embodiment, and can be changed as appropriate.

(4) In the embodiments described above, a configuration is exemplified in which the gate driver 15 is formed in a monolithic manner on the glass substrate 16; however, the gate driver 15 may be configured as a driver chip and mounted on the glass substrate 16.

(5) The location where the test circuit portion IA is disposed is not limited to the location illustrated in FIG. 2, and may be disposed near the display region AA, for example.

(6) The shape of the pixel overlapping opening 10H1 formed in the common electrode 10H may be changed as appropriate, and may be a V-shape, for example. Additionally, the number of pixel overlapping openings 10H1 overlapping each pixel electrode 10G need not be two or more and may be at least one.

(7) The inclined extending portions 21A and 22A of the position detection lead-out lines 21 and 22 may be completely overlapped with each other, or overlapped with each other while slightly shifted in the width direction. In other words, the amount of overlap of the inclined extending portions 21A and 22A can be set as appropriate. Furthermore, the position detection lead-out lines 21 and 22 may have the same width or a different width. Furthermore, the position detection lead-out lines 21 and 22 may be overlapped with each other along the entire length thereof, or may be overlapped with each other only along a portion of the entire length.

(8) The inclined extending portions 31A and 32A of the source lead-out lines 31 and 32 may be completely overlapped with each other or may be overlapped with each other while slightly shifted in the width direction. In other words, the amount of overlap of the inclined extending portions 31A and 32A can be set as appropriate. Furthermore, the source lead-out lines 31 and 32 may have the same width or a different width. Furthermore, the source lead-out lines 31 and 32 may be overlapped with each other along the entire length thereof, or may be overlapped with each other only along a portion of the entire length.

(9) The position detection lead-out lines 21 and 22 may be electrically connected at three or more locations.

(10) The drain electrode of the TFT 10F and the pixel electrode 10G are formed on the gate insulating film 23; however, the layering order thereof is not limited. The drain electrode of TFT 10F may be formed above the pixel electrode 10G or under the pixel electrode 10G.

(11) The position detection line 20 and the source line 10J are disposed in the same layer, but may not necessarily be formed of the same material. For example, the position detection line 20 may be formed by layering the material that forms the source line 10J and the material that forms the pixel electrode 10G.

REFERENCE SIGNS LIST

10 Liquid crystal panel (display panel)
10A CF substrate (counter substrate)
10B, 110B, 210B Array substrate (substrate)
16 Glass substrate
10D Sealing member
10G Pixel electrode
10H Common electrode
10J Source line (pixel line)
14 Position detection electrode
20 Position detection line
21 Position detection lead-out line (first position detection lead-out line)

22 Position detection lead-out line (second position detection lead-out line)
25 Conductive film (conductive film formed from the same material as that of position detection electrode)
31 Source lead-out line (first pixel lead-out line)
32 Source lead-out line (second pixel lead-out line)
AA Display region
NAA Non-display region
125 Conductive film (conductive film formed from the same material as that of position detection electrode)

The invention claimed is:

1. A display panel comprising:
a substrate divided into a display region configured to enable an image to be displayed and a non-display region surrounding the display region;
a plurality of pixel electrodes disposed in the display region;
a plurality of position detection electrodes disposed in the display region and configured to detect an input position by a position input body, the plurality of position detection electrodes constituting a common electrode disposed overlapping the plurality of pixel electrodes;
a pixel line disposed in the display region and connected to pixel electrodes of the plurality of pixel electrodes;
a plurality of position detection lines disposed in a layer identical to a layer of the pixel line in the display region and each connected to a position detection electrode of the plurality of position detection electrodes;
a pixel lead-out line disposed in the non-display region and extending from one end of the pixel line;
a first position detection lead-out line disposed in a layer identical to a layer of the pixel line in the non-display region and extending from one end of a position detection line of the plurality of position detection lines; and
a second position detection lead-out line disposed in a layer different from a layer of the pixel line in the non-display region and extending from one end of a position detection line of the plurality of position detection lines different from the position detection line from which the first position detection lead-out line extends, the second position detection lead-out line extending overlapping the first position detection lead-out line.

2. The display panel according to claim 1 further comprising:
a counter substrate spaced from and facing the substrate; and
a sealing member interposed between the substrate and the counter substrate and surrounding a space between the substrate and the counter substrate,
wherein the sealing member is formed from a photo-curable resin material, and
a portion of the sealing member is disposed overlapping the first position detection lead-out line and the second position detection lead-out line.

3. The display panel according to claim 1,
wherein a first pixel lead-out line of two of the pixel lead-out lines that are adjacent to each other is disposed in a layer identical to a layer of the pixel line, and
a second pixel lead-out line of two of the pixel lead-out lines is disposed in a layer identical to a layer of the second position detection lead-out line and extends overlapping the first pixel lead-out line.

4. The display panel according to claim 1,
wherein the first position detection lead-out line and the second position detection lead-out line are electrically connected to a position detection electrode of the plurality of position detection electrodes, and
the first position detection lead-out line and the second position detection lead-out line are electrically connected to each other at at least two locations.

5. The display panel according to claim1,
wherein a position detection line of the plurality of position detection lines and the second position detection lead-out line are electrically connected to each other via a conductive film, the conductive film being formed from a material identical to a material of the plurality of position detection electrodes.

6. The display panel according to claim 4,
wherein the first position detection lead-out line and the second position detection lead-out line are electrically connected to each other via a conductive film, the conductive film being formed from a material identical to a material of the plurality of position detection electrodes.

* * * * *